United States Patent [19]

Manning

[11] 4,248,455

[45] Feb. 3, 1981

[54] HEAVY-DUTY SUSPENSION SYSTEM

[76] Inventor: Donald L. Manning, 4002 Normanwood Dr., Orchard Lake, Mich. 48033

[21] Appl. No.: 77,467

[22] Filed: Sep. 20, 1979

[51] Int. Cl.³ ............................................. B60G 11/26
[52] U.S. Cl. ................................. 280/711; 280/112 R; 296/178
[58] Field of Search ................ 296/178; 280/711, 713, 280/43.17, 43.18, 43.23, 112 R, 112 A

[56] References Cited

U.S. PATENT DOCUMENTS 3,007,715  11/1961  Maharick .............................. 280/711
3,768,825  10/1973  Magnusson ....................... 280/112 R Primary Examiner—John J. Love
Assistant Examiner—John A. Carroll
Attorney, Agent, or Firm—Reising, Ethington, Barnard, Perry & Brooks

[57] ABSTRACT

The invention relates to an air suspension system uniquely disposed and mounted between the vehicle underbody and the wheel-supporting sub-frame to facilitate minimum clearance between the vehicle floor and the ground, to enhance vehicle roll stability, and to enable the front end of the vehicle to be more efficiently lowered or tilted to facilitate passenger ingress and egress.

10 Claims, 6 Drawing Figures

HEAVY-DUTY SUSPENSION SYSTEM

TECHNICAL FIELD

This invention relates to a wheel suspension system for heavy-duty vehicles such as buses. The invention particularly involves a vehicle of the type wherein the driver's seat and front passenger entrance or door overhang or project forwardly of the steerable wheels of the vehicle and wherein the steerable wheels are supported upon a sub-frame articulated to the underbody of the vehicle. More specifically, the invention relates to an air suspension system uniquely disposed and mounted between the vehicle underbody and the wheel-supporting sub-frame to facilitate minimum clearance between the vehicle floor and the ground, to enhance vehicle roll stability, and to enable the front end of the vehicle to be more efficiently lowered or tilted to facilitate passenger ingress and egress.

BACKGROUND OF INVENTION

It is known in the prior art to provide air suspension systems whereby the vehicle body can be raised or lowered relative to the ground to facilitate the loading of passengers. However, such prior systems have been complicated and have not located the air suspension system in relation to the main body, the wheel-supporting sub-frame, and the steerable wheels so as to minimize the quantity of air to be changed in order to raise and lower the front end of the vehicle to thereby increase the responsiveness of the system in loading and unloading the vehicle while at the same time enhancing the vehicle's transverse or roll stability and lowering the normal height of the floor above the ground.

Today there is an increasing demand for new types of buses, particularly for use in metropolitan areas, which are both more fuel efficient, are easier to repair, and which will more readily accommodate handicapped passengers. As part of the effort to meet these needs, attention is focusing on new types of suspension systems, both front and rear. As shown in his U.S. Pat. No. 4,131,209, Applicant has already developed a new and improved retractable ramp to enable handicapped passengers to have more easy ingress and egress through the front door of a bus. To maximize the effectiveness of such a ramp, an improved bus body design has been developed whereby the vehicle floor is lower to the ground and whereby a single boarding step is possible.

In furtherance of the desire to ease the boarding of handicapped persons, Applicant's invention is directed to a new and simplified front wheel suspension system whereby the front end of a bus may be easily lowered to facilitate passenger loading and unloading, and further which ability is particularly critical for passengers confined to wheelchairs or having to use walking stands or crutches.

Applicant's system is particularly adapted for use with a vehicle wherein the driver's position and a front entrance are disposed forwardly of the steerable wheels. In order to provide for the normal springing of the vehicle body as well as to provide a "kneeling" feature, the steerable wheels are mounted on the fixed axle or base of a sub-frame the other end of which extends rearwardly and is pivotally articulated to the underbody rearwardly of the steerable wheels.

Various articulated or V-shaped wheel suspension sub-frames are shown in the prior patented art and are typified by the following U.S. Pat. Nos.: 1,479,187 Lansden; 2,132,963 Nallinger; 3,735,999 Blackledge et al; 3,744,813 Magleave; 3,865,396 Bates; and 3,768,825 Magnusson. Applicant's front wheel suspension system differs from the prior art both in the orientation and area of articulation of his sub-frame with respect to the vehicle underbody as well as the location of the air springs between the sub-frame and a transverse beam of the underbody. Furthermore, Applicant's invention locates the front wheel suspension system rearwardly of the steerable wheels and the front end of the bus whereby the suspension system is protected against damage or displacement in the event of a front end collision.

In the type of vehicle with which Applicant's invention is concerned, the vehicle body is most preferably of a monocoque design wherein an upper body is integrally formed with an underbody to eliminate the traditional frame or chassis. Accordingly, Applicant has developed a new type of A-shaped sub-frame which uniquely coacts with the vehicle underbody to support the sprung mass of the vehicle and permits the selective lowering and raising of the front door area of the vehicle to aid in the loading and unloading of handicapped passengers.

In the present invention the vehicle underbody extends laterally or transversely beyond the A-shaped sub-frame such that the steerable wheels are recessed within the underbody and the upper body. The sub-frame includes a transverse axle upon which the steerable wheels are rotatably supported. The sub-frame also includes a transverse cross beam element disposed longitudinally between the axle and the point of articulation of the sub-frame to the underbody. Further, such cross beam element extends laterally so as to terminate proximate the area where the underbody and upper body are joined. A pair of adjustable air spring members are respectively supported between the outer ends of the cross beam element and the underbody and in generally longitudinal alignment with the steerable wheels.

As typified by the aforementioned Lansden, Blackledge and Nallinger patents, it is common practice to mount sub-frame spring members along or proximate to the axle element rather than intermediate the axle and the point of articulation of a sub-frame and the vehicle body.

The location of the air spring members in relationship to the steerable wheels, the underbody and the A-shaped sub-frame is significant in achieving the desired performance of Applicant's suspension system. In other words, mounting the air spring members on a transverse axis intermediate the steering wheel axle and the point of articulation of the A-shaped sub-frame to the underbody reduces the amount of vertical movement of each spring member necessary to lower and raise the front end of the vehicle and, accordingly, speeds the body raising and lowering action to reduce the time necessary to allow ingress or egress through the front vehicle door. This is a particularly important capability when the suspension system is utilized with a ramp device, such as shown in Applicant's U.S. Pat. No. 4,131,209, for loading and unloading handicapped passengers. Furthermore, the outboard location of the adjustable air spring members in alignment with the steerable wheels transmits spring loads more directly to the vehicle body thereby enhancing its transverse or roll stability.

BEST MODE FOR CARRYING OUT THE INVENTION

Figure 1:
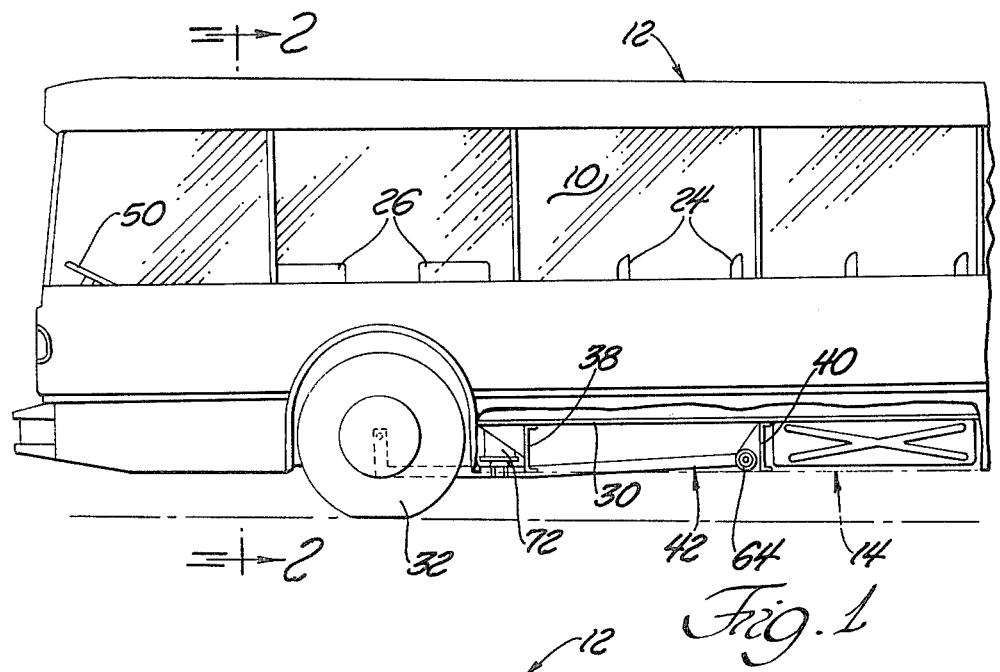
FIG. 1 is a partially sectioned side elevational view of the front end of a bus embodying Applicant's suspension.
Figure 2:
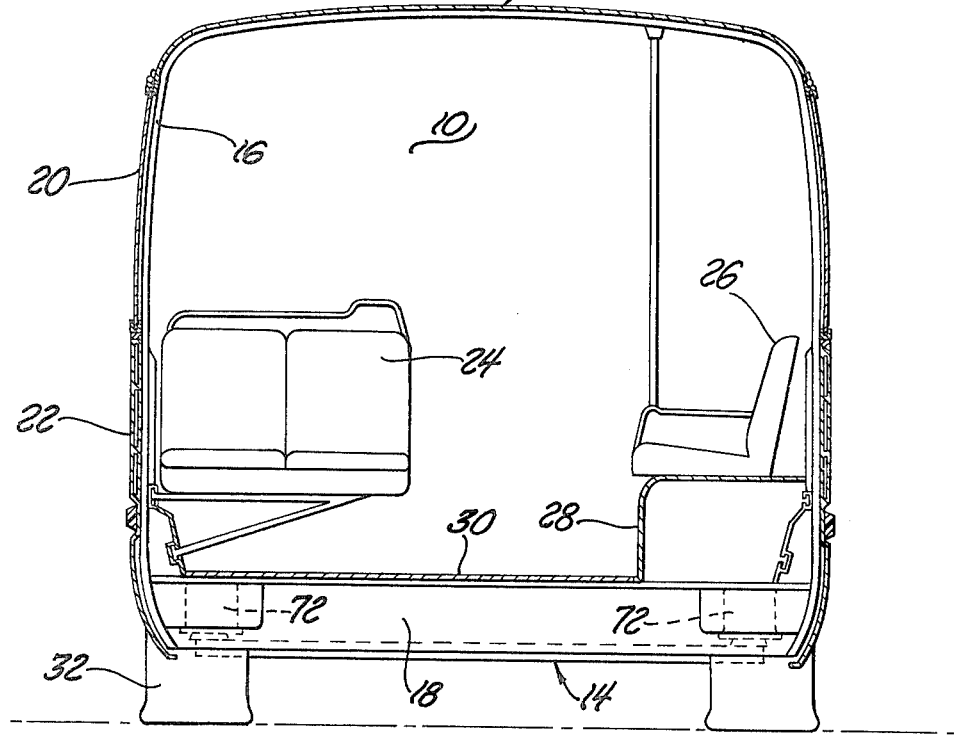
FIG. 2 is a cross sectional view of the bus body along line 2—2 of FIG. 1.

Referring particularly to FIGS. 1 and 2 of the drawings, a bus is indicated generally at 10. The bus is of a monocoque construction and comprises an upper body indicated generally at 12 and an underbody indicated generally at 14. Upper body 12 is comprised of a tubular frame structure 16 the lower ends of which are integrally secured to a plurality of transverse beams, such as 18, which form a portion of underbody 14. Windows 20 and an outer unstressed skin 22 are suitably secured to the tubular frame 16 to provide the outer surface of the vehicle body. In thus integrally joining the tubular frame 16 to the transverse beams of underbody 14, a unitized body is formed which eliminates the need for the typical vehicle frame or chassis and enables both the lowering and lightening of the body structure.

As seen in the cross sectional view of FIG. 2, transverse passenger seats 24 are cantilever supported within the passenger compartment upon tubular frame 16. Other longitudinal seats 26 may be supported on body wheel wells 28. The monocoque or unitized body construction leaves the outer vehicle skin unstressed inasmuch as the vehicle body loads are transmitted directly from the underbody to the tubular frame structure. Such unitized body construction reduces the body mass and enables the passenger compartment floor 30 to be an integral part of the underbody thereby reducing the height or vertical displacement of such floor relative to the ground.

Figure 3:
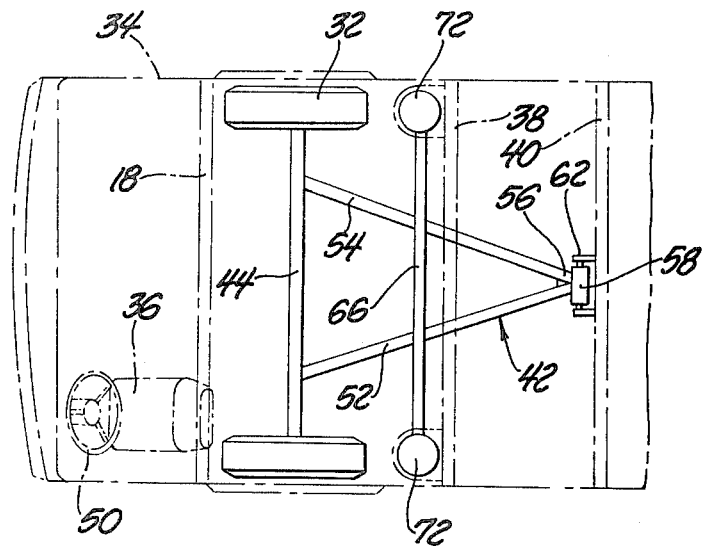
FIG. 3 is a plan view of the sub-frame.

Again as best seen in FIG. 1 and the partial plan view of FIG. 3, the upper body 12 and underbody 14 project forwardly or overhang the steerable front wheels 32 whereby a front door 34 and the driver's position 36 are transversely aligned forwardly of said steerable wheels.

Figure 5:
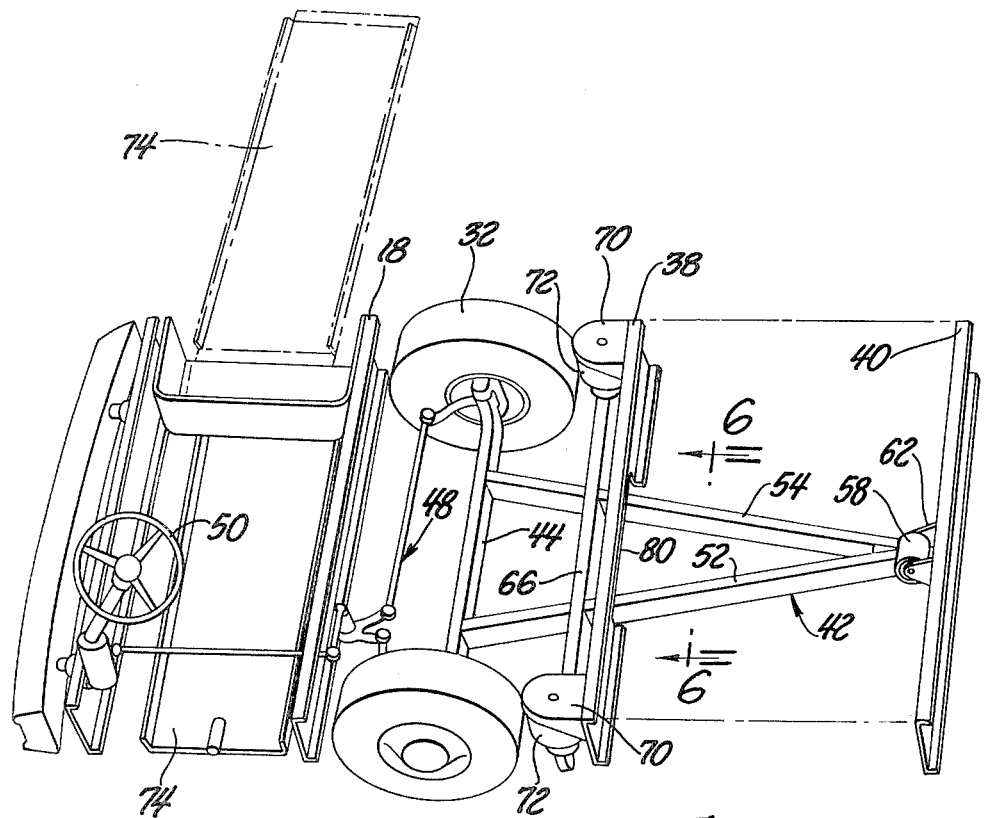
FIG. 5 is a perspective view of the front end of the vehicle underbody and sub-frame.

As best seen in FIGS. 3 and 5, underbody 14 includes a plurality of transverse beams extending across the entire width of the bus body with such beams being longitudinally spaced and parallel to each other. For the purposes of the present invention, only those transverse beams relating to the front suspension area will be identified and described. Passenger floor 30 is secured, as by welding, to the upper flanges of the transverse beams and thus provides a structurally reinforcing portion of the overall vehicle body. While the transverse beams of underbody 14 may have various transverse shapes and may be of tubular configurations, in the illustrated embodiment such beams are C-shaped in cross section. First transverse beam 18 extends laterally of underbody 14 and is disposed immediately rearwardly of the front door area and driver's seat and is further positioned immediately forwardly of the steerable wheels 32.

Underbody 14 includes a second transverse beam 38 spaced rearwardly of the first transverse beam 18 and rearwardly adjacent of steerable wheels 32. A third transverse beam 40 is spaced rearwardly of the second transverse beam 38. Underbody 14 includes additional transverse beams longitudinally spaced from each other throughout the length of the vehicle body and are sufficient in number and spacing to provide the required structural strength for the vehicle underbody.

Figure 4:
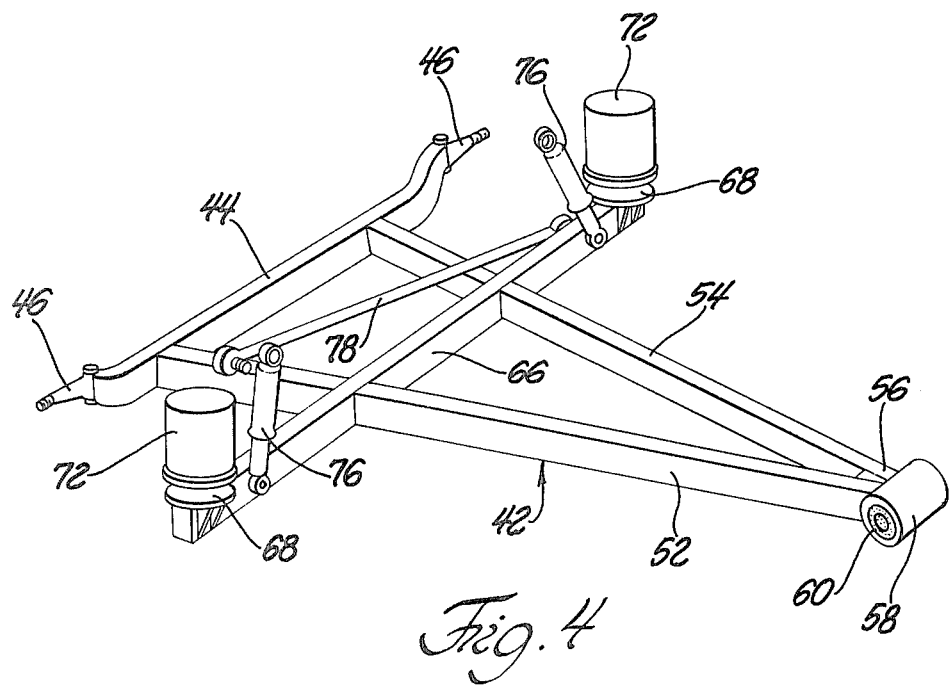
FIG. 4 is a detailed perspective view of the sub-frame removed from the vehicle.

A sub-frame is indicated generally at 42 and for ease of seeing the details thereof is isolated in FIGS. 3 and 4. Sub-frame 42 includes an axle portion 44 to the outer ends of which suitable spindle members 46 are pivotally supported for rotatably supporting steerable wheels 32. A conventional steering linkage system 48 interconnects the steerable wheels with the driver operated steering wheel 50.

Sub-frame 42 includes side frame members 52 and 54 fixed at their forward ends inboard of the outer ends of axle 44. Side frames 52 and 54 extend rearwardly and laterally converge to form an apex portion 56. The apex portion 56 of sub-frame 42 terminates in a cylindrical sleeve 58 within which a suitable and relatively stiff rubber cylindrical bushing 60 is fitted. A suitable U-shaped bracket member 62 is fixed to the third transverse beam 40 midway of the transverse ends thereof. A pin member 64 is secured to U-shaped bracket 62 and projects through rubber bushing 60 to articulate the apex end of sub-frame 42 to the third transverse beam 40. Bracket pin 64 and rubber bushing 60 allows the sub-frame to pivot relative to transverse beam 40 and also to have a limited universal movement relative thereto.

Sub-frame 42 also includes a transverse cross beam member 66 interconnecting with the side frame members 52 and 54. Cross beam member 66 is longitudinally spaced between axle member 44 and the apex 56 of sub-frame 42 and is generally spaced from one-third to one-half the longitudinal distance between the axle and said apex.

As best seen in FIG. 3, axle 44 is disposed generally parallel to and longitudinally midway of the transverse beams 18 and 38 of underbody 14. The cross beam 66 of sub-frame 42 is disposed beneath and immediately forward of transverse beam 38 of the underbody. The cross beam 66 extends laterally outboard of the converging side frame elements 52 and 54 and includes circular pad members 68 fixed to the outer ends thereof in generally longitudinal alignment with the steerable wheels 32. Pads 68 are also positioned proximate the outer ends of transverse beam 38 and as close as possible to the juncture of the transverse beam with the upper body frame 16. At the same time, corresponding pads 70 are fixed to or otherwise integrally formed with the upper side of transverse cross beam 38 of the underbody and with pads 70 being in vertical alignment with the pads 68 of cross beam element 66.

A pair of adjustable spring elements, and being air bags 72 in the preferred form of the invention, are suitably secured between the lower pads 68 of cross beam element 66 and the upper pads 70 of the second transverse beam 38.

Air bags 72 are intended to function as normal spring members to absorb road shocks transmitted from wheels 32 through sub-frame 42 to the vehicle body and also to function as a means for adjusting the vertical displacement of the front end of the vehicle body relative to the wheel axle 44 whereby the front door area 34 of the vehicle body may be lowered or raised to facilitate the ingress and egress of passengers. Thus, air bags 72 give the front end of the vehicle a "kneeling" capability which is particularly useful in aiding in the boarding of handicapped persons and facilitates the incorporation of a retractable ramp, indicated in phantom outline at 74, and the operation of which ramp is described in Applicant's U.S. Pat. No. 4,131,209.

Referring again to FIG. 4, suitable shock absorbers 76 may be articulated between cross beam 66 of sub-frame 42 and the underbody 14 to dampen the relative vertical movement of the vehicle body relative to sub-frame 42. Likewise, a rigid Panhard link 78 is articulated at one end to sub-frame cross beam 66 and extends across the upper side of the sub-frame for articulation at its other end to transverse cross beam 38 to restrict relative transverse movement between sub-frame 42 and the vehicle body.

The outboard and rearward positioning of air bags 72 relative to sub-frame axle 44 is a critical feature of the subject invention. By positioning them rearwardly of sub-frame axle 44, air bags 72 may be positioned outwardly to the maximum extent possible thereby transmitting vehicle body supporting and shock loads directly to the upper body frame structure 16, eliminating intermediate load-transmitting structural members as are frequently necessary when such spring devices are disposed substantially inboard of the vehicle body. Further, roll stability or the tendency of a vehicle to roll about its longitudinal axis varies as the square of the distance between spring centers. Accordingly, the ability to move or position the air springs outwardly to increase the distance between centers greatly enhances the vehicle's roll stability.

As noted previously, to facilitate the loading and unloading of handicapped persons, various modifications are being made in bus body and suspension designs to lower the floor of the bus relative to the ground. The present body and suspension system are part of this effort as well as the companion goal of lighter weight construction for all bus components to reduce fuel consumption. Such modifications are being made in an effort to meet certain governmental requirements that the vehicle floor not be more than 22 inches above the ground and that there be no less than 6.5 inches of ground clearance at the axle. Further, to achieve a high strength, light weight sub-frame, the axle 44 and side frame elements 52 and 54 are preferably made of a hollow rectangular cross section. Thus, the limited clearance between the sub-frame axle 44 and vehicle floor 30 makes it difficult to locate air springs upon or proximate to the axle.

With respect to sub-frame 42, the maximum vertical movement of the front end of the vehicle body occurs above axle 44. Thus, their mounting upon or adjacent axle 44 would require air bags having the maximum height, for example 8 inches, in order to provide a lowering or "kneeling" of the front door area of about 4 inches for boarding or unloading purposes.

By positioning air bags 72 rearwardly of sub-frame axle 44, the present invention enables the use of air bags having a shorter vertical displacement, e.g. 6 inches as opposed to 8 inches if located upon the axle. At the same time, the smaller displacement air springs require less air to be exhausted from or added to the air bags to effect a lowering or raising of the front end of the vehicle relative to sub-frame axle 44. The advantage of reducing air volume change is that the lowering and raising of the front end of the vehicle can be effected more rapidly than would be the case if, for example, larger volume air bags were located on or adjacent the sub-frame axle 44. In other words, with the air bags located intermediate sub-frame axle 44 and apex 56, the "kneeling" action of the front end of the vehicle may be effected more quickly thereby expediting the loading and unloading of passengers.

Since it does not form a part of the subject invention as hereinafter claimed, the mechanism for controlling the air flow into and out of air bags 72 is not shown. It is to be understood, however, that the operative part of such mechanism would be located conveniently to the driver who may effect the "kneeling" action as required.

The rearward location of sub-frame 42 with respect to steerable wheels 32 has several additional advantages. First, since the sub-frame is spaced a considerable distance rearwardly of the front of the vehicle, as best seen in FIGS. 1 and 3, a front end collision will enable the impact of such collision to be absorbed by that portion of the vehicle body forward of wheels 32 before any impact energy is transmitted to sub-frame 42. In this way vehicle damage may be limited to the body without requiring costly repair to the front wheel suspension system.

Next, the rearward location of sub-frame 42 enables the front door step to be lower and also provides room for the incorporation of a retractable ramp as shown in Applicant's U.S. Pat. No. 4,131,209 without raising the bus floor level.

Figure 6:
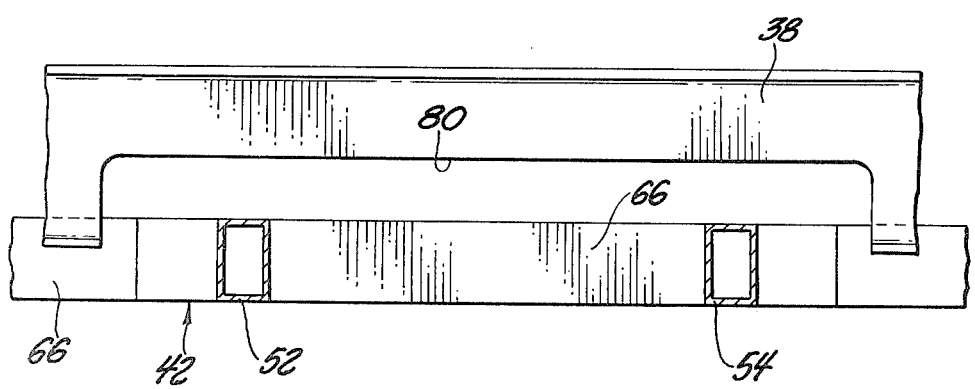
FIG. 6 is a view along line 6—6 of FIG. 5.

In order to maximize the clearance of sub-frame 42 from the ground, it will be seen in FIG. 1 that pin 64 of U-shaped bracket 62 is spaced vertically on transverse beam 40 so that the cylindrical portion 58 of sub-frame 42 does not project below the beam. For the same purpose, and as seen in FIGS. 5 and 6, the second transverse beam 38 has a central cut-away section 80 to accommodate vertical movement of underbody 14 relative to the side frame elements 52 and 54 of sub-frame 42.

It is apparent that other modifications may be made within the intended scope of the invention as set forth in the hereinafter appended claims.

What is claimed is:

1. A suspension system for a vehicle of the type wherein the driver's position and a front door are generally transversely aligned at the front end of the vehicle main body and the steerable front wheels are disposed on the body immediately rearwardly of the driver position and front door, said suspension system comprising:

an underbody extending substantially throughout the length and width of said main body, said underbody including a first transverse beam disposed subadjacently rearwardly of the driver position and front door, a second transverse beam spaced rearwardly of said first transverse beam, a third transverse beam spaced rearwardly of said second transverse beam;

a sub-frame including a transverse axle member parallel to and disposed intermediate said first and second transverse beams, a pair of side frame members extending respectively from spaced points along the length of said axle and converging to form an apex longitudinally spaced from said axle member, pivotal joint means connecting the apex of said sub-frame to said third transverse beam, a pair of wheel spindles pivotally mounted to the respective ends of said axle members and rotatably supporting the steerable front wheels, a cross beam element interconnecting the side frame members and disposed proximate said second transverse beam, means for limiting lateral movement of said sub-frame relative to said underbody, and a pneumatic mechanism mounted between the cross beam element of said sub-frame and the underbody to permit vertical adjustment of the front end of the underbody relative to the sub-frame axle.

2. A suspension system of the type set fourth in claim 1 wherein the cross beam element of said sub-frame extends laterally beyond the side frame members and terminates generally in longitudinal alignment with the steerable wheels, said pneumatic mechanism comprising first and second air bag elements supported on the cross beam element outboard of the side frame members of the sub-frame.

3. A suspension system as set forth in claim 2 wherein said vertically adjustable air bags are generally longitudinally aligned with said steerable wheels.

4. A suspension system as set fourth in claim 1 wherein the means for limiting the lateral movement of said sub-frame comprises a rigid link pivoted at one end to the cross beam of the sub-frame and pivoted at its other end to the second transverse beam of the underbody.

5. A suspension system as set forth in claim 1 wherein each of the transverse beams of the underbody are C-shaped in cross section and include a vertical portion interconnecting upper and lower flanges.

6. A suspension system as set forth in claim 5 wherein the apex of said sub-frame terminates in a cylindrical portion having a major axis parallel to the third transverse beam of the underbody, an elastomeric bushing fitted within said cylindrical portion, said pivotal joint means comprising a U-shaped bracket mounted to the vertical portion of the third transverse beam and a transverse pin extending through the elastomeric bushing and pivotally securing the cylindrical portion of the apex of said sub-frame to said U-shaped bracket.

7. A suspension system as set forth in claim 5 wherein the central portion of the second transverse beam has a laterally extending and downwardly opening recess to provide clearance for the side frame members as the underbody moves vertically relative to the side frame elements of said sub-frame.

8. A suspension system as set forth in claim 2 wherein the sub-frame includes a first set of air bag supporting pads fixed to the cross beam element in generally longitudinal alignment with the steerable wheels, a second set of air bag supporting pads mounted on said underbody in vertical alignment with said first set of pads, said air bags secured between said first and second sets of pads.

9. A suspension system as set fourth in claim 1 wherein the transverse cross beam is located between one-third and one-half the longitudinal distance between the axle and the apex of said sub-frame.

10. A suspension system for a vehicle of the type wherein a driver's position and a front door are generally transversely aligned at the front end of the vehicle and steerable front wheels are disposed immediately rearwardly of the driver position and front door, said vehicle including
an upper body having a tubular frame structure, an underbody having a plurality of longitudinally spaced and parallel transverse beams and including
a first transverse beam disposed subadjacently rearwardly of the driver position and front door,
a second transverse beam spaced rearwardly of said first beam,
a third transverse beam spaced rearwardly of said second beam,
said tubular frame structure being integrally secured to the outer ends of said transverse beams;

said suspension system comprising
a sub-frame including
a transverse axle member parallel to and disposed intermediate said first and second transverse beams,
a pair of side frame members extending respectively from spaced points along the length of the axle and converging to form an apex longitudinally spaced from said axle member,
pivotal joint means for connecting the apex of the sub-frame to said third transverse beam,
said steerable wheels rotatably and steerably supported to the outer ends of said axle member,
a cross beam element interconnecting the side frame elements and subadjacently disposed proximate the second transverse beam, and
pneumatic means mounted between said cross beam element and said underbody proximate the juncture of the tubular frame of the upper body and the underbody, said pneumatic means permitting vertical adjustment of the front end of the underbody relative to the sub-frame axle.

* * * * *